Nov. 18, 1958   M. DISHAL ET AL   2,861,177
CONTROL SYSTEM FOR CORRECTING PHASE AND AMPLITUDE
Filed April 4, 1955   6 Sheets-Sheet 1

INVENTORS
MILTON DISHAL
JESSE S. LE GRAND
GEORGE L. PELLIGRINELLI
HOMER W. MORROW
JOHN A. KOEHLER
BY Philip M. Bolton
ATTORNEY Nov. 18, 1958  M. DISHAL ET AL  2,861,177
CONTROL SYSTEM FOR CORRECTING PHASE AND AMPLITUDE
Filed April 4, 1955  6 Sheets-Sheet 2

INVENTORS
MILTON DISHAL
JESSE S. LE GRAND
GEORGE L. PELLIGRINELLI
HOMER W. MORROW
JOHN A. KOEHLER
BY Philip M. Bolton
ATTORNEY Nov. 18, 1958  M. DISHAL ET AL  2,861,177
CONTROL SYSTEM FOR CORRECTING PHASE AND AMPLITUDE
Filed April 4, 1955  6 Sheets-Sheet 3

INVENTORS
MILTON DISHAL
JESSE S. LE GRAND
GEORGE L. PELLIGRINELLI
HOMER W. MORROW
JOHN A. KOEHLER
BY Philip M. Bolton
ATTORNEY

Nov. 18, 1958    M. DISHAL ET AL    2,861,177
CONTROL SYSTEM FOR CORRECTING PHASE AND AMPLITUDE
Filed April 4, 1955    6 Sheets-Sheet 5

INVENTORS
MILTON DISHAL
JESSE S. LE GRAND
GEORGE L. PELLIGRINELLI
HOMER W. MORROW
JOHN A. KOEHLER
BY Philip M. Bolton
ATTORNEY United States Patent Office 2,861,177
Patented Nov. 18, 1958

2,861,177
CONTROL SYSTEM FOR CORRECTING PHASE AND AMPLITUDE

Milton Dishal, Nutley, and Jesse S. Le Grand, Wood-Ridge, N. J., George L. Pellegrinelli, New York, N. Y., and Homer W. Morrow, East Orange, and John A. Koehler, Maywood, N. J., assignors to International Telephone and Telegraph Corporation, Nutley, N. J., a corporation of Maryland Application April 4, 1955, Serial No. 499,046

9 Claims. (Cl. 250—17)

The present invention relates to a control system for automatically adjusting two or more electrical waves with respect to each other in phase and amplitude, and more particularly to such a system in which the waves are brought into phase coincidence and amplitude equality within close limits.

Many uses exist for control systems for bringing two waves into phase and amplitude agreement within close limits. For example, in the radio beacon system known as "Navaglobe" three antennas are cyclically fed in pairs to produce three differently-directed radiation patterns. In an airplane using this beacon as a guide, the waves received according to each of these different patterns are compared, and a line of direction is obtained therefrom. For this bearing to be accurate, it is essential that the waves radiated from the antennas be closely controlled in amplitude and phase. This may be accomplished by using the control system of the present invention to adjust the wave radiated by each antenna with respect to a common reference wave thus bringing all of them into close phase and amplitude agreement.

Many other uses can be found for automatically bringing two waves into phase and amplitude agreement.

An object of the present invention is the provision of such a control system.

Another object is the provision of such a control system in which the waves are brought into amplitude and phase agreement within extremely close limits, without requiring an unusual accuracy of the elements of the system, the accuracy required being well within the range of present-day practice.

In accordance with the main feature of the present invention, the A. C. difference between two waves is taken, and in response to this difference the relative phase and amplitude of said waves are separately adjusted to bring the two waves into close amplitude and phase agreement.

In accordance with a further feature of the present invention the A. C. difference of said waves is compared in a special type of comparison device with a comparison voltage. The comparison voltage may consist, for example, of one of said waves, or preferably the sum of both waves. The comparison device is of the type which produces an output dependent on the magnitude of said A. C. difference and its phase angle with respect to the comparison voltage. Such devices produce a null or minimum output when said magnitude is at a null or when said phase angle is at a given angle, as for example, 0°, 180°, or 90°, 270°, depending on whether the particular device obeys a sine or cosine law respectively. Two such comparison devices are employed, the output of one being used to adjust the amplitude of one of the waves, and the output of the other simultaneously adjusting the phase of one of said waves. When the output of each comparison device is at its null, the waves are in close agreement in phase and amplitude.

Other and further objects of the present invention will become apparent, and the foregoing will be better understood with reference to the following description of embodiments thereof, reference being had to the drawings in which.

Figure 1:
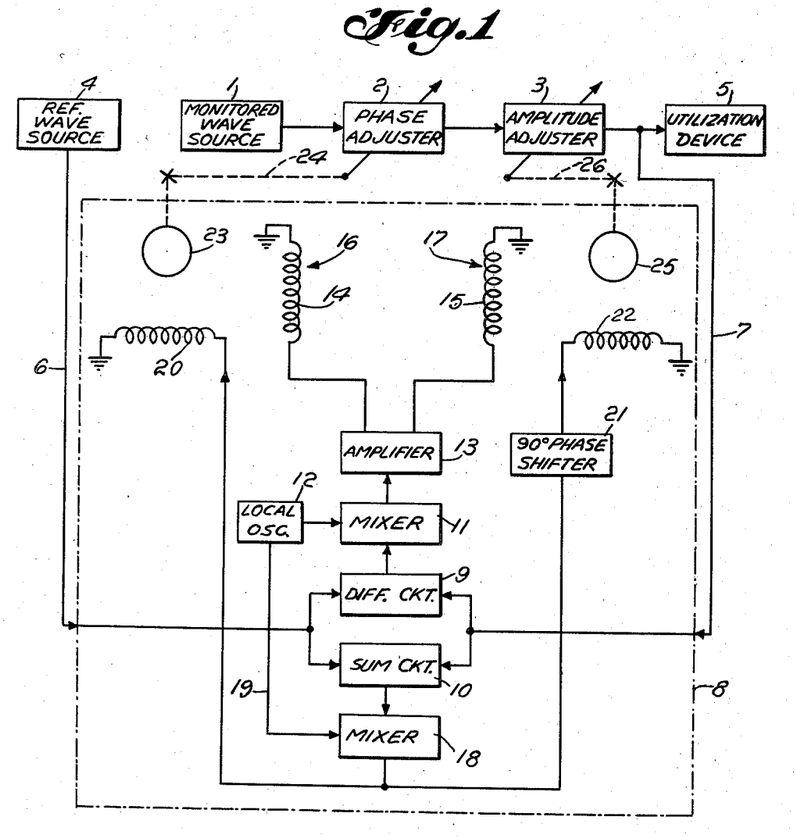
Fig. 1 is a schematic and block diagram of a general system including the control arrangement of the present invention.

Referring now to Fig. 1, the system there disclosed has a monitored wave source 1 whose output is to be adjusted by means of a phase adjuster 2 and amplitude adjuster 3 to bring said output into close agreement in phase and amplitude with the wave from a reference wave source 4. The monitored wave source 1 may be independent of reference wave source 4 or may be derived therefrom. The adjusted output of the monitored wave source 1 may be applied to any suitable utilization device 5.

The waves from reference signal source 4 and the monitored wave from the final output of the phase adjuster 2 and amplitude adjuster 3 are fed by means of lines 6 and 7, respectively, to a control arrangement, generally designated by the numeral 8, whose output is used to actuate the phase adjuster 2 and the amplitude adjuster 3 to bring these waves into close phase and amplitude agreement.

The reference and monitored waves from lines 6 and 7 respectively are fed to a difference circuit 9 which takes the A. C. difference of the waves and to a sum circuit 10 which takes the A. C. sum of the waves.

The A. C. difference voltage is applied to a mixer 11 which is also fed by a local oscillator 12. The output of the mixer 11 is fed via an amplifier 13 to one of the windings 14 and 15 of each of two two-phase induction motors 16 and 17, respectively. The A. C. sum voltage from circuit 10 is applied to a mixer 18 also fed by local oscillator 12. The output of mixer 18 is directly applied to the other winding 20 of motor 16 and through a 90° phase shifter 21 to the other winding 22 of motor 17. The shaft of rotor 23 of motor 16 drives the phase adjuster 2 through a mechanical linkage 24 while the shaft of rotor 25 of motor 17 separately drives the amplitude adjuster 3 through a mechanical linkage 26.

It will be noted that the A. C. difference voltage between the reference and monitored waves is compared with sum voltage of the reference and monitored waves in motor 16 which adjusts the phase of the monitored waves. It will likewise be noted that said A. C. difference voltage is compared with said sum voltage shifted by 90°, in induction motor 17, which adjusts the amplitude of the monitored wave. It is also to be noted that the phase adjustment by motor 16 and the amplitude adjustment by motor 17 occur simultaneously, These considerations are of importance in understanding the operation of the system.

In understanding the theory of operation of the present invention, it is necessary to examine the characteristics of the two-phase induction motors of Fig. 1 and similar voltage or current comparison devices. The comparison devices used in the present invention have as a major characteristic that their output is a function of the magnitude of the compared voltages or currents and their relative phase angle. This may be expressed as:

$$\text{Output} = f(R_a, R_b, \alpha) \quad (Eq. 1)$$

where $R_a$ and $R_b$ are the magnitudes of the two voltages being compared, and $\alpha$ is the phase angle of $R_b$ with respect to $R_a$.

The function of the phase angle, may be, for example, a sine or cosine function depending upon the specific type of comparison device employed. Likewise depending upon the specific type of comparison device employed, the output may be mechanical or electrical. The foregoing will become clearer from an examination of two examples of such comparison devices: the two-phase induction motor and the synchronous detector.

The two-phase induction motor has a mechanical output and follows a sine law which may be simply expressed as:

$$\text{Stall-torque} \propto R_a R_b \sin \alpha \quad (Eq. 2)$$

The synchronous detector using square law rectifiers has an electric D. C. output and follows a cosine law. It may be expressed as:

$$\text{D. C. output} \propto R_a R_b \cos \alpha \quad (Eq. 3)$$

When the synchronous detector uses linear rectifiers, $R_a$ being a fixed reference, and $R_a \gg R_b$, then the law may be expressed as:

$$\text{D. C. output} \propto R_b \cos \alpha \quad (Eq. 4)$$

It is important to keep in mind that the outputs (mechanical and electrical) of the comparison devices are used in the present system to adjust the phase and amplitude outages of the two waves being controlled. As long as these waves are out of agreement, an output must be produced from the comparison devices to adjust these differences, but when the two waves are brought into agreement a zero or a null output must be obtained from the comparison devices. In other words, the control system operates towards bringing about a null output from the comparison devices (at which condition the two control waves are in close agreement). It is therefore important to consider under what conditions such a null output may be obtained. More specifically, since such null output is determined by the two voltages being compared by the device, it is important to consider the relationship of these voltages which drives to a null output.

From Equations 1–4 it is quite clear that a null output may be produced by varying the phase angle $\alpha$ of the A. C. voltages being compared. Where the comparison device obeys a cosine law, such null will be produced when $\alpha = 90°$ or $270°$; where the device obeys a sine law, a null output will be produced when $\alpha = 0°$ or $180°$. It will also be seen from the above equations that a null output may also be obtained if the magnitude of one of the compared voltages ($R_b$) is reduced to zero. We thus have two ways of producing a null output, the first-mentioned one which we shall refer to as the "phase null mode" of operation of the comparison device, and the last-mentioned one as the "amplitude null mode" of operation of the comparison device. It will be clear that if the system is so arranged that the phase angle $\alpha$ cannot be brought to the angle at which it produces a null, then in order to obtain our null it is necessary to use the amplitude null mode of operation and reduce the amplitude of $R_b$ to zero. As a matter of practice, it is found that while the phase null mode of operation may be used for the initial adjustment of the phase of the monitored wave, it is necessary in order to obtain a final high accuracy of adjustment that the amplitude null mode be used for the final adjustment. Stated another way, by varying the phase or amplitude of the two waves being controlled the phase of the A. C. difference voltage applied to the comparison devices may be initially varied to bring the output of the comparison device towards a phase null, however, in the final adjustment variation of the phase or amplitude of the two waves being controlled must cause the amplitude of the A. C. difference voltage to approach zero in order to achieve great accuracy. One major reason for using the amplitude null mode for the final adjustment is due to the great difficulty of setting the comparison voltage $R_a$ which is derived from the reference wave to an exactly known and exactly stable phase, this fact prevents obtaining highly accurate adjustments using the phase null mode of operation of said comparison devices. Accordingly, the system is so arranged that towards the final stages of adjustment in each comparison device the angle $\alpha$ will produce maximum output and therefore the final null output can only be produced by causing $R_b$ to approach zero.

The difference output obtained by simply subtracting the reference wave from the monitored wave (as previously described) produces an ideal drive for the above type of operation. For the purposes of this analysis the effect of the mixers and local oscillator is ignored as they do not change the essential nature thereof. The purpose of these devices will be discussed hereinafter.

Figure 2A:
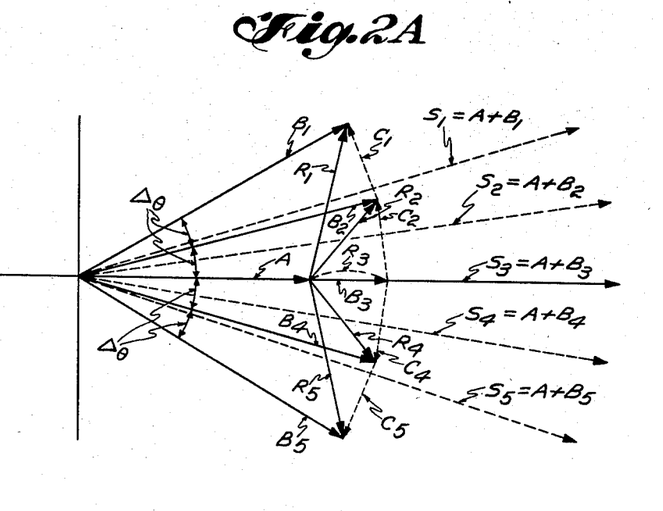
Figs. 2A to 2D inclusive comprise a set of phasor diagrams used in describing the operation of the various embodiments of the invention.

Let us now examine in detail the amplitude and phase characteristics of the A. C. difference output referring to the phasor diagrams of Fig. 2A. First considering the method by which the phase adjusting output is obtained from motor 16, take the case of an arbitrary fixed amplitude outage $B/A$ between the reference and monitored waves and a variable phase outage $\Delta\theta$, B representing the magnitude of the monitored wave and A that of the reference wave. This situation is shown in Fig. 2A with the reference wave phasor A along the X axis and the phasor of the monitored wave assuming various positions $B_1$–$B_5$. Taking the difference between each of the phasors B and the reference phasor A ($B-A$, not $A-B$), we obtain resultants $R_1$–$R_5$ representing the A. C. difference between these waves. As described above, these A. C. difference voltages $R_1$–$R_5$ (different values of $R_b$) are compared with the sum of the two waves which is represented as S in Fig. 2A with $S_1 = A + B_1$, $S_2 = A + B_2$, etc.

As the phase outage $\Delta\theta$ of the monitored wave B is varied, at the desired condition of $\Delta\theta = 0$, the phasor difference $R_3$ has no component perpendicular to $S_3$ with which it is being compared in motor 16, and this is true only for the desired condition of $\Delta\theta = 0$. Since the motor obeys a sine law we obtain a zero or phase null output from the motor two in this case of an arbitrary amplitude ratio when, and only when, we have correctly achieved the desired result of making $\Delta\theta = 0$; this fact being independent of the amplitude outage $B/A$ between the two waves. It is obvious that a correct sense is obtained to drive towards this null. This will be apparent from an examination of the components $C_1$, $C_2$, etc. of $R_1$, $R_2$, etc. which are perpendicular to the corresponding sum of the two waves. Stated more fully, this will be apparent from the components of the A. C. difference between the two waves, which components are perpendicular to the sum of the two waves. Thus, it will be seen that $C_1$ and $C_2$ above the X axis are positive and $C_4$ and $C_5$ below the X axis are negative, the shaft of the motor being driven by these components in opposite directions and towards the phase null.

Figure 2B:
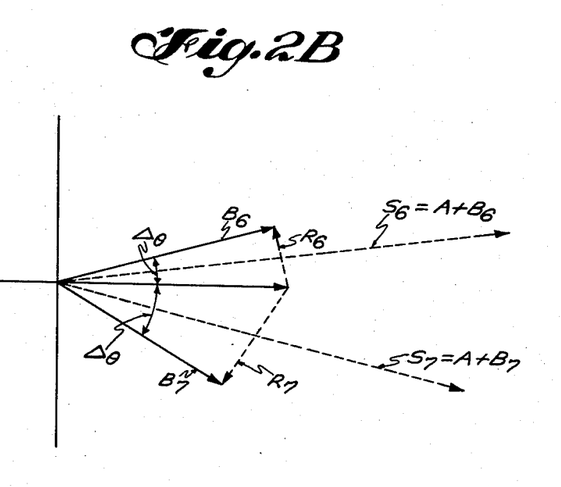

It must also be realized that simultaneously with the above phase adjustment, amplitude adjustments are being made by motor 17, and the condition is finally approached where the phase adjustments are being made with B almost exactly equal to A as shown in Fig. 2B. From Fig. 2B it is seen that for the final step when B is equal to A, a change in the phase angle $\Delta\theta$ cannot cause $R_6$ to rotate into alignment with $S_6$, that is $R_6$ is maintained at either 90 degrees or 270 degrees with reference to $S_6$. We thus have the condition where a phase null can no longer be obtained and thus we are forced from the phase null mode of operation into the amplitude null mode described hereinabove. This is the condition sought to be achieved, and is brought about by simultaneously correcting both amplitude and phase. Until the resultant $R_b$ vanishes, an output will be obtained from the motor 16 which rotates B, causing the resultant $R_b$ to decrease in magnitude until it reaches a null while the angle $\alpha$ which $R_b$ makes with respect to S is substantially unchanged.

Figures 2C, 2D:
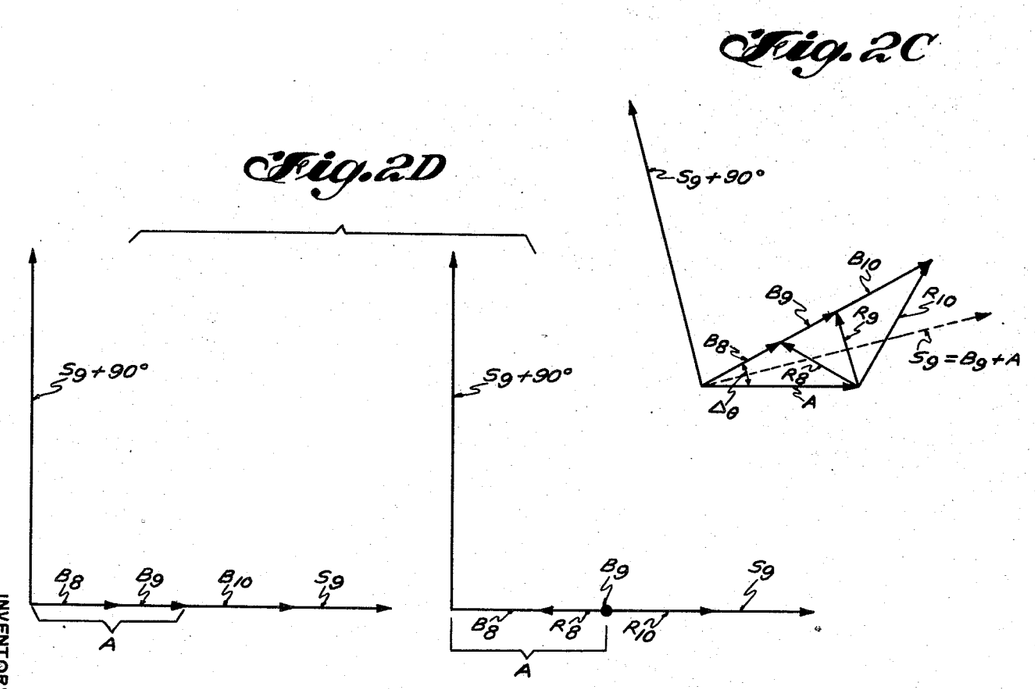

Let us now consider the method by which the output is obtained for the amplitude correcting motor 17. Let us examine the case of an arbitrary fixed phase outage $\Delta\theta$ between the two waves and a variable amplitude ratio $B/A$. The situation is shown in Fig. 2C with the phasor A of the reference wave along the X axis. In Fig. 2C the phasor labelled $B_9$ is the adjustment we desire; i. e., $B_9 = A$. The resulting phasor difference is $R_9$. We see that if we wish to obtain a null from motor 17 when $B_9$ is reached it must be a phase null, that is $R_9$ must have no components perpendicular to $S_9 + 90°$, which is the 90° phase shifted sum of the two waves being controlled. This 90° phase shift is accomplished by phase shifter 21. Thus, $R_9$ must be parallel to $S_9 + 90°$, and $S_9$, before being shifted 90°, must be perpendicular thereto to produce the phase null. It is quite clear that this condition exists when $B_9$ is equal to A, for the sum of $B_9 + A$ will be perpendicular to $R_9$, and when shifted 90° into the position designated $S_9$ it will be parallel thereto. It will likewise be clear that proper sense will be obtained for driving motor 17 in the proper direction so that B is driven towards A in magnitude.

The next step in the analysis is the realization that while making the above amplitude corrections, simultaneously phase corrections are being made as previously described, and thus in the final steps of the amplitude corrections the phase outage will approach zero, and the conditions shown in Fig. 2D are reached.

As shown in Fig. 2D for this final specific case where $\Delta\theta$ is equal to zero, the condition is reached wherein it is impossible by means of amplitude adjustments to make the difference phasor R be at right angles to $S_9$ (parallel to $S_9 + 90°$); and it is thus impossible to produce a phase null, thus in these final adjustment steps the mode of operation changes to the amplitude null mode, and the only way zero output can be obtained is by making the difference phasor $R_b$ zero in magnitude.

From the foregoing description of the operation of the phase adjusting motor 16 and the amplitude adjusting motor 17 it is clear that the system changes automatically in both, from the phase null mode to the amplitude null mode because both phase and amplitude are being simultaneously corrected. Thus, Fig. 2A is forced to approach Fig. 2B for the phase adjusting motor 16 while Fig. 2C is forced to approach Fig. 2D for the amplitude correcting motor 17. These two processes occur simultaneously and are convergent.

While the comparison voltage $R_a$ used for the phase adjusting motor 16 could be the voltage of the reference wave, voltage A, it is preferred to use the sum of the two waves as comparison voltage $R_a$ since a greater output is to be produced when the outage between the waves is not at its null.

In the foregoing description and throughout the specification it is assumed that the two waves are of the same frequency or close thereto. If the two waves are of different frequencies, the described control arrangement could under appropriate circumstances obvious to one versed in the art continuously operate the phase adjuster to keep the two waves both in phase and frequency agreement. This, of course, assumes that the phase adjuster is continuously variable over a range sufficient to make such correction.

With regard to the details shown in Fig. 1, it might be pointed out that the mixers and the local oscillators 11, 12, and 18 merely serve to reduce the frequency of the signal applied to the motors to a frequency at which these motors operate most efficiently. This frequency conversion does not change the basic nature of the analysis hereinabove. With respect to amplifier 13 the gain thereof should be sufficient so that the A. C. difference voltage applied to windings 14 and 15 should have a relatively large value as this difference departs from the null so that for even a slight departure from the null the voltage of the A. C. difference is adequate to operate the motors. The exact gain used in a specific case will depend upon the required phase and amplitude accuracy; the transfer constant of the phase and amplitude adjusters; the speed of correction which is desired, the mechanical advantage of the mechanical linkage used, the torque constant of the motor, the moment of inertia of the mechanical system, etc. in accord with well known servo mechanism principles. The output of amplifier 13 fed to both windings 14 and 15 may be a common output or may be separated by some suitable means such as buffer amplifiers if it is desired to prevent interaction between the windings coupled to said amplifier. The 90° phase shifter 21 may be any known type of phase shifter such as a condenser in series with a resistor. Since the system does not depend for its final adjustment on the angle $\alpha$ (the phase angle between the difference and sum voltages applied to motors 16 and 17) it is quite clear that the accuracy of 90° phase shifter is not critical, and slight errors therein can easily be tolerated. The phase and amplitude adjusters 2 and 3 may be of any suitable type and may be external to the monitored wave source 1 or part thereof.

For the difference and sum circuit many circuits are known for taking the A. C. difference and the A. C. sum of waves. However, we prefer to use a single circuit shown in Fig. 3 which gives both the A. C. sum and difference very simply.

Figure 3:
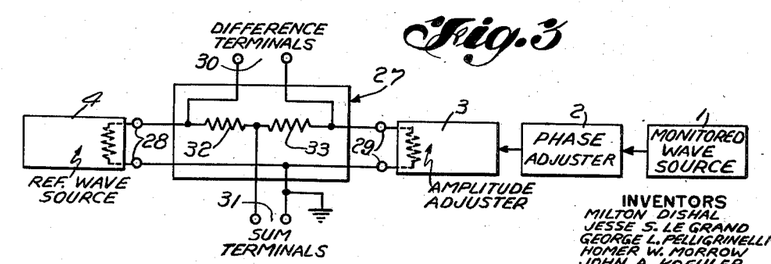
Fig. 3 is a diagram of a preferred circuit for taking the sum and difference of two voltages and is one of the elements in the system shown in Fig. 1.

Referring now to Fig. 3, the sum and difference circuits 9 and 10 consist of a single four-terminal-pair network 27 having two pairs of input terminals 28 and 29 and two pairs of output terminals 30 and 31. One of the terminals of the pairs 28, 29, and 31 is grounded. The ungrounded terminals of pairs 28 and 29 are connected together by two series resistors 32 and 33 whose midpoint is connected to the ungrounded output terminal of pair 31. The output terminals of the pair 30 are connected across the outer ends of resistors 32 and 33, respectively. It will be seen that the network is similar to circuits which have been given the name hybrid circuit, bi-conjugate network, etc. It will be recognized that if pairs of terminals 28 and 29 are accurately terminated, then there will be no interaction between terminals 30 and 31. The signal from the reference wave source 4 is applied to the pair 28 while the monitored wave source is connected via the phase and amplitude adjusters to the other pair 29. Accurate matching terminations are provided at terminal pairs 28 and 29 or in the devices connected therewith. This A. C. sum of the waves is taken from terminal pair 31 while the A. C. difference is taken from terminal pair 30.

Figure 4:
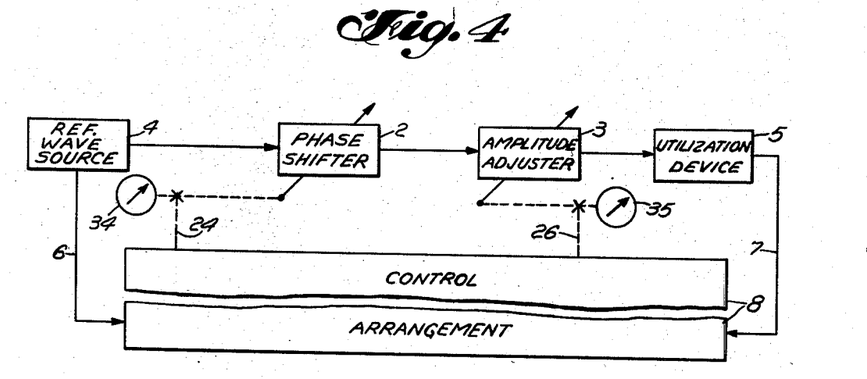
Fig. 4 is a schematic and block diagram of another system including the control arrangement of Fig. 1.

While in Fig. 1 the monitored wave source 1 is shown as independent of reference wave source 4, the monitored wave, as has been pointed out hereinbefore, may be derived from the reference wave source. A system of this type is disclosed in Fig. 4 utilizing the control arrangement 8 described with respect to Fig. 1. It will be seen that the reference wave source 4 is connected through the phase adjuster 2 and amplitude adjuster 3 to the utilization device 5 whose output is then treated as the monitored wave and fed along line 7 to the control arrangement 8 where it is compared with the reference wave from source 4, fed along line 6. As in Fig. 1 the mechanical linkages 24 and 26 control phase and amplitude adjusters 2 and 3, respectively. The system herein described has many uses. One use of this system is where the utilization device is a filter network whose characteristics are to be measured. Indicators 34 and 35 are connected to mechanical linkages 24 and 26 and driven thereby to indicate the amount of adjustment of the phase and amplitude adjusters 2 and 3, respectively. It will be apparent that the amount of phase and amplitude adjustment required to balance the output of utilization device 5 with that of reference wave source will be an indication of the attenuation and phase shifting introduced by the utilization device 5. Thus, if said device 5 is a filter its attenuation and phase shifting characteristics can be read from indicators 34 and 35, directly.

Figure 5:
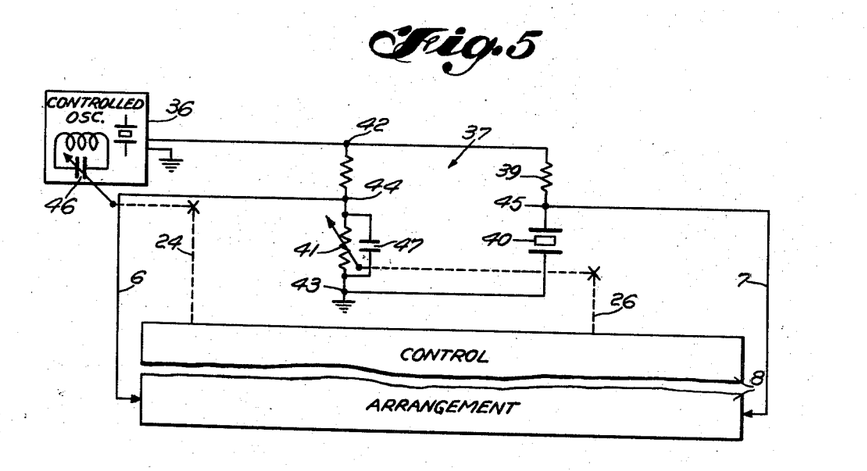
Fig. 5 is a schematic and block diagram of another system in which the control arrangement is used to control the frequency of an oscillator.

The control arrangement of Fig. 1 may also be used to closely control the frequency of an oscillator. It is known that even crystal-controlled oscillators, due to aging of the tubes therein and aging of other components, tend to vary their output frequency in time. Various means have been suggested for controlling such oscillators to make up for the effect of aging and other variations. In Fig. 5 an arrangement is shown according to the present invention in which such an oscillator 36 is controlled by a control arrangement 8 according to Fig. 1 utilizing a frequency responsive circuit, in the form of a bridge 37. The circuit consists of two arms having fixed resistors 38 and 39, respectively, and two other arms having a piezo crystal 40 and an adjustable resistor 41 shunted by a condenser 47 closely equal to the crystal holder capacity. In the two branches between terminal 42 and its opposite terminal 43 resistor 38 is in series with the $R_6$ combination 41, 47, and resistor 39 is in series with the crystal 40 in the other branch. The output of oscillator 36 is connected to one terminal 42 of the circuit, the opposite terminal 43 being grounded. The two other terminals of the circuit are labelled 44 and 45 with terminal 44 being between resistor 38 and resistor 41, and terminal 45 between resistor 39 and crystal 40. Terminals 44 and 45 are connected via lines 6 and 7 to the control arrangement 8. A typical design of the frequency sensitive circuit 37 would make resistors 38, 39 and variable resistor 41 all approximately equal in value to the series resonant resistance of the crystal 40, and the value of the capacitance 47 would closely equal the crystal holder capacitance. It will be apparent that the phase and amplitude of the wave at terminal 45 will differ from the phase and amplitude of the wave at terminal 44 as the oscillator 36 shifts from the frequency from the chosen operating point on the reactance vs. frequency characteristic of the crystal 40. Consequently, when these frequencies are misaligned, the wave fed along line 7 into the control arrangement will differ in phase and amplitude from that fed in at line 6. The mechanical linkage 24 which adjusts phase is applied to a frequency determining circuit 46 in oscillator 36 to adjust said oscillator's frequency while the amplitude adjusting linkage 26 adjusts resistor 41. These two adjustments will cause the amplitude and phase of the wave at terminal 44 of the circuit to be kept in close agreement with the amplitude and phase of the wave at terminal 45 of the circuit, which is the desired operating condition. Any drifts in frequency of the controlled oscillator will destroy this phase and amplitude equality which will cause the control arrangement 8 to immediately correct this drift.

Figure 6:
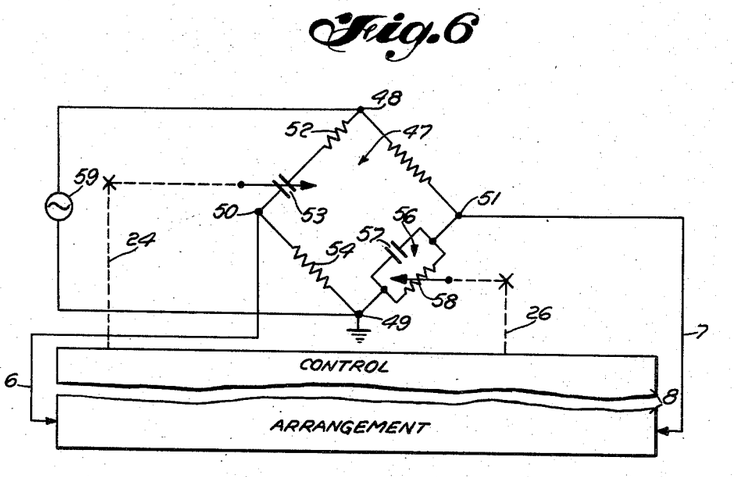
Fig. 6 is a schematic and block diagram of a system in which the control arrangement is used for automatically balancing a bridge.

The control arrangement of the present invention may also be employed for the purpose of automatically balancing a Schering bridge as shown, for example, in Fig. 6 where the Schering bridge 47 is disclosed as consisting of two pairs of opposite terminals 48, 49 and 50, 51. Between terminals 48 and 50 there is a resistor 52 in series with an adjustable capacitor 53. Between terminals 49 and 50 there is a fixed resistor 54, and between terminals 47 and 51 there is another fixed resistor 55. Between terminals 49 and 51 there is a parallel circuit 56 consisting of a fixed condenser 57 and an adjustable resistor 58. The output of an oscillator 59 of the frequency at which the bridge is to be balanced is connected across terminals 48 and 49 while terminals 50 and 51 are connected via lines 6 and 7 to a control system 8 similar to that of Fig. 1. The mechanical linkage 24 of control system 8 is coupled to and controls variable capacitor 53 while the mechanical linkage 26 adjusts resistor 58. It will be seen that at terminals 50 and 51 two waves will be produced which differ in phase and in amplitude according to the misalignment of the bridge. The control arrangement 8 operates to adjust the capacitor 53 and the variable resistor 58 so as to balance the bridge at the frequency of source 59 so that the amplitude and phase of the waves at terminals 50 and 51 are in close agreement.

Figure 7:
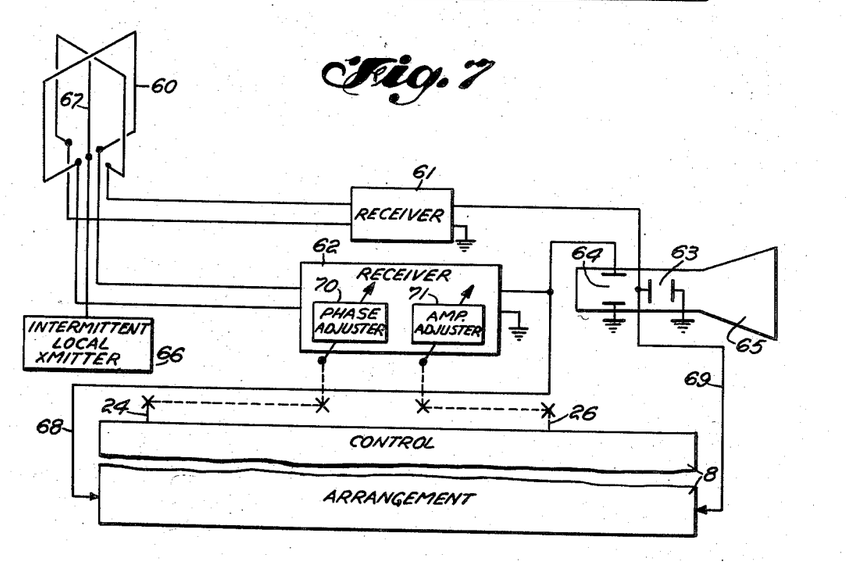
Fig. 7 is a schematic and block diagram of a known type of direction finder, using the control arrangement of Fig. 1 for adjusting the balance thereof.

Another use of the present invention is shown in Fig. 7 in which a direction finder of the type known as the Watson-Watt direction finder may be balanced. Briefly, this direction finder consists of two crossed loop antennas 60 whose outputs are fed to two different receivers 61 and 62, the output of the receivers in turn being fed to different sets of deflection plates 63 and 64, respectively, of a cathode ray display tube 65. When a signal is received by the pair of antennas 60 which is transmitted directly along the center line between their radiation patterns the output of receivers 61 and 62 should be the same both in amplitude and phase. For the purpose of adjusting the receivers 61 and 62 use is made of a local transmitter 66 which intermittently sends out signals along an antenna 67 along said center line of the pair of antennas 60. The output of receivers 61 and 62 is fed along lines 68 and 69, respectively, to the control arrangement 8 of Fig. 1 which via mechanical linkages 24 and 26 adjusts a phase and amplitude adjuster 70 and 71 in one of the receivers such as, for example, receiver 62.

While the control arrangement described in Fig. 1 employs two phase induction motors for adjusting the amplitude and phase, the output of said motors being mechanical, these may be replaced by analogous devices whose output is electrical, such as the synchronous detector. The output of the synchronous detectors may be electrically or mechanically applied (through servo mechanisms) to effect independent amplitude and phase adjustment. Such an arrangement employing synchronous detectors and servomotors is disclosed in Fig. 8 in connection with a Navaglobe system.

Figure 8:
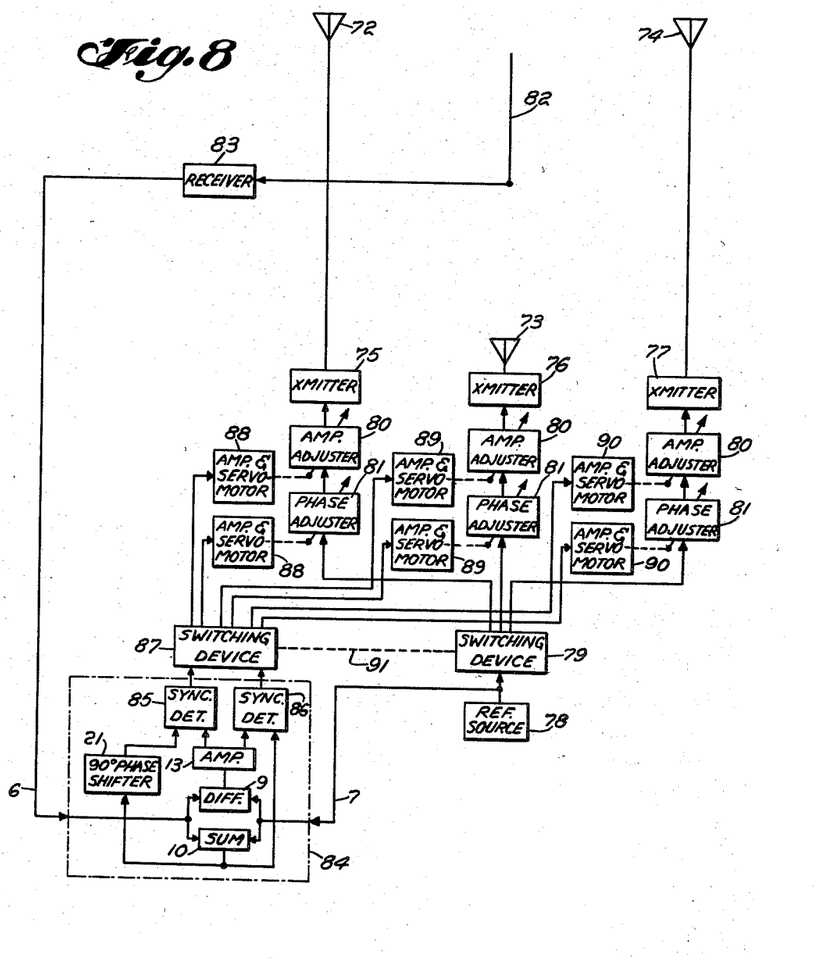
Fig. 8 is a block diagram of a Navaglobe radio beacon transmitter using a modification of the control arrangement of Fig. 1.

Fig. 8 represents a conventional Navaglobe system having three antennas 72, 73 and 74 arranged at the corners of an equilateral triangle and which antennas are energized from transmitters 75, 76 and 77. A reference source 78, commonly referred to as a clock, provides the same control frequency for each transmitter. The antennas are energized in pairs so as to provide differently directed radiation patterns and for this purpose a switching device 79 is provided between the reference source and the transmitters and couples the reference source to two of said transmitters at a time so that cyclically and sequentially the following pairs of antennas are energized: 72 and 73, 73 and 74, and 74 and 72. For the purposes of monitoring, either the single antennas are energized, in between the periods of energization of the pairs of antennas as above described, or all the antennas are then energized. Further details of systems of this type may be found in the following U. S. patents: No. 2,541,040, entitled "Radio Range Beacon," issued to R. I. Colin, and in the copending patent application of P. R. Adams-B. Alexander-R. I. Colin, Serial No. 382,934, filed September 29, 1953, entitled "Aerial Navigation Indicator," and in the copending patent application of M. Dishal-M. Rogoff, entitled "Aerial Navigation Beacon System," Serial No 491,082, filed February 28, 1955. It is essential that the phase and amplitude of the waves radiated by the antennas be in close agreement and to insure this the present invention provides a control arrangement involving an amplitude and phase adjuster 80 and 81 between switching device 79 and each of the different transmitters. These adjusters are controlled by comparing the wave from reference source 78 with a wave picked up by an omnidirectional antenna 82 electrically equidistant from antennas 72, 73 and 74. Antenna 82 feeds a receiver 83 whose output is fed into a control arrangement 84 which is similar to that of Fig. 1 except that it uses synchronous detectors and servomotors. Thus, within arrangement 84 lines 6 and 7 are connected to sum and difference circuits 9 and 10, the output of difference circuit 9 being fed through amplifier 13 to one input of each of the phase detectors. The output of sum circuit 10 is connected to the other input of synchronous detectors 85 and 86 with the 90° phase shifter in this instance connected between the sum circuit and phase detector 25, whereas no phase shifter is arranged between the sum circuit and synchronous detector 86. Synchronous detector 85 is used to control the phase adjusters 81, while synchronous detector 86 is used to control the amplitude adjusters 80. Since the output of phase detectors follows a cosine law instead of the sine law, it is necessary to shift one of the inputs to these phase detectors by 90° with respect to the input to the motors of the control arrangement of Fig. 1, remembering that said motors obey a sine law. Consequently, by moving the 90° phase shifter into the connections connecting the sum circuit and synchronous detector 85 both output leads from the sum circuit are shifted 90° as applied to the phase detectors in comparison with the arrangement of Fig. 1. The analysis hereinabove referring to the phasor diagrams of Fig. 2 applies with the sole exception that the reference voltages, that is, the sum voltages applied to each of the comparison devices are shifted 90°. The outputs of the synchronous detectors 85 and 86 are applied to a switching device 87 to successively connect the control arrangement to different pairs of amplifiers and servomotors 88, 89, and 90, with pair 88 adjusting the wave applied to transmitter 75, pair 89 adjusting the wave applied to transmitter 76 and pair 90 adjusting the wave applied to transmitter 77. One servomotor of each pair adjusts the phase under the control of synchronous detector 85 and the other servomotor of each pair adjusts the amplitude under the control of synchronous detector 85. Assuming that during one monitoring period antenna 72 alone is radiating, switching device 87 will connect synchronous detectors 85 and 86 to servomotors 88. When this monitoring period has ended, the switching device 87 disconnects leaving the servomotors 88 stationary in the position in which they have adjusted their associated amplitude and phase adjusters 80 and 81. In the next monitoring period during which antenna 73 alone is radiating, connection is made to its associated servomotors 89 for effecting the adjustment. A similar operation occurs at a third monitoring period during which antenna 74 alone is radiating.

Switching devices 79 and 87 are synchronized as indicated by line 91. Further details including the switching devices and the particular types of synchronous detectors will be apparent to one versed in the art in conjunction with the patent and applications referred to hereinabove.

While we have described our invention in relation to specific embodiments thereof, it should readily be apparent that many variations may be made without departing from the teachings hereof. For example, other comparison devices than the synchronous detectors and two phase induction motors may be employed. Instead of employing comparison devices giving an electrical output with servo mechanisms, such electrical output may be employed through electrical means to control the phase and amplitude of the waves being controlled. Furthermore, it is apparent from the disclosure hereinbefore that the amplitude adjustment may be made in one wave and the phase adjustment in the other, or that both adjustments may be made in one wave. Numerous other modifications and uses of the present invention will readily occur to one versed in the art from the foregoing description.

Accordingly, while we have described our invention above with reference to specific embodiments, it is to be understood that the invention is to be interpreted by the state of the prior art and the appended claims.

We claim:

1. An electric system for bringing two waves into close phase and amplitude agreement comprising a source of said waves, a phase adjuster coupled to said source for adjusting the phase of one of said waves, an amplitude adjuster coupled to said source for adjusting the amplitude of one of said waves, means coupled to said source for taking the alternating current difference between said waves, means coupled to said source for deriving a reference voltage from one of said waves, a first comparison means for comparing said alternating current difference with said reference voltage to produce an output that varies according to their phase and magnitude outage and reaches a null when their phase outage is a null, a second comparison means for comparing said alternating current difference with said reference voltage to produce an output that varies according to their phase and magnitude outage and reaches a null when their amplitude outage is a null, means connecting said first comparison means to control said phase adjuster, and means connecting said second comparison means to control said amplitude adjuster.

2. An electric system for bringing two waves into close phase and amplitude agreement comprising a source of said waves, a phase adjuster coupled to said source for adjusting the phase of one of said waves, an amplitude adjuster coupled to said source for adjusting the amplitude of one of said waves, means coupled to said source for taking the alternating current difference between said waves, means coupled to said source for taking the sum of said waves, a first comparison means for comparing said alternating current difference with said sum to produce an output that varies according to their phase and magnitude outage and reaches a null when their phase outage is a null, a second comparison means for comparing said alternating current difference with said sum to produce an output that varies according to their phase and magnitude outage and reaches a null when their amplitude outage is a null, means connecting said first comparison means to control said phase adjuster, and means connecting said second comparison means to control said amplitude adjuster to bring said waves into closer phase and amplitude agreement.

3. An electric system according to claim 1 in which said first and second comparison means are synchronous detectors.

4. An electric system according to claim 3 wherein said first comparison means also includes means for shifting the reference voltage by 90°.

5. An electric system according to claim 3 in which said means connecting said first comparison means and said means connecting said second comparison means are synchronous motors.

6. An electric system according to claim 1 wherein said first and second comparison means are two-phase induction motors and said connecting means are mechanical, linking said motors to said adjusters.

7. An electric system according to claim 6 in which said second comparison means includes means for shifting the reference voltage by 90°.

8. An electric system for controlling the waves radiated from a plurality of intermittently-transmitting antennas to bring them into close phase and amplitude agreement comprising a receiving antenna means electrically equidistant from each of the transmitting antennas, a receiver connected to said receiving antenna means, a plurality of phase adjusters and amplitude adjusters, one phase and one amplitude adjuster being associated with each transmitting antenna to control the phase and amplitude of the wave emitted therefrom, a reference wave source, means for taking the alternating current difference between the wave received from said receiver and the wave from said reference source, means responsive to said alternating current difference for producing separate phase and amplitude adjusting voltages, a plurality of servomotors one of each being associated with each one of said amplitude adjusters and phase adjusters, and switching means for applying said phase adjusting and amplitude adjusting voltages to the servomotors associated with each transmitting antenna during at least part of the period in which it is transmitting.

9. An electric system for controlling the waves radiated from a plurality of intermittently-transmitting antennas to bring them into close phase and amplitude agreement comprising a receiving antenna means electrically equidistant from each of the transmitting antennas, a receiver connected to said receiving antenna means, a plurality of phase adjusters and amplitude adjusters, one phase and amplitude adjuster being associated with each transmitting antenna to control the phase and amplitude of the wave emitted therefrom, a reference wave source, means for comparing the waves received from said receiver with the wave from said reference source and producing separate phase adjusting and amplitude adjusting voltages, a plurality of servomotors one of each being associated with each one of said amplitude adjusters and phase adjusters, and switching means for applying said phase adjusting and amplitude adjusting voltages to the servomotors associated with each transmitting antenna during at least part of the period in which it is transmitting.

References Cited in the file of this patent
UNITED STATES PATENTS

| Number | Name | Date |
| --- | --- | --- |
| 2,358,454 | Goldstine | Sept. 19, 1944 |
| 2,449,174 | O'Brien | Sept. 14, 1948 |
| 2,479,817 | Curran | Aug. 23, 1949 |
| 2,520,823 | Bach | Aug. 29, 1950 |
| 2,562,943 | Pensyl | Aug. 7, 1951 |
| 2,691,733 | MacSorley | Oct. 12, 1954 |
| 2,745,067 | True et al. | May 8, 1956 |